(12) United States Patent
Kashiwagi et al.

(10) Patent No.: US 10,777,227 B2
(45) Date of Patent: Sep. 15, 2020

(54) MAGNETIC DISK DEVICE AND CONTROL METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventors: Kazuto Kashiwagi, Yokohama Kanagawa (JP); Kazuhito Shimomura, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/299,839

(22) Filed: Mar. 12, 2019

(65) Prior Publication Data
US 2020/0090699 A1    Mar. 19, 2020

(30) Foreign Application Priority Data
Sep. 13, 2018    (JP) .................. 2018-171675

(51) Int. Cl.
*G11B 20/18*    (2006.01)
*G11B 27/36*    (2006.01)
*G11B 5/012*    (2006.01)

(52) U.S. Cl.
CPC .............. *G11B 20/18* (2013.01); *G11B 5/012* (2013.01)

(58) Field of Classification Search
CPC ......... G11B 27/36; G11B 20/12; G11B 20/18; G11B 19/041; G11B 20/1883; G11B 2020/1823; G11B 19/122; G11B 23/0303; G11B 23/28

USPC ....... 360/48, 53, 31; 369/53.1, 53.12, 53.15, 369/53.17, 53.21
See application file for complete search history.

(56) References Cited

U.S. PATENT DOCUMENTS

| | | | | |
|---|---|---|---|---|
| 5,438,559 | A * | 8/1995 | Best .................. | G11B 20/1252 360/51 |
| 7,325,155 | B2 * | 1/2008 | Trantham ............ | G06F 11/1008 714/6.24 |
| 8,699,162 | B1 * | 4/2014 | Grobis ..................... | G11B 5/09 360/45 |
| 8,837,074 | B1 * | 9/2014 | Burd ................ | G11B 20/10046 360/31 |
| 9,229,813 | B2 | 1/2016 | Chatradhi et al. | |
| 9,437,240 | B1 | 9/2016 | Haddock | |
| 9,552,256 | B2 * | 1/2017 | Kim ..................... | G06F 11/1064 |
| 9,728,215 | B2 | 8/2017 | Kanamaru et al. | |
| 9,922,678 | B2 * | 3/2018 | Burd .................. | G11B 20/1833 |
| 2014/0139942 | A1 * | 5/2014 | Grobis ................. | G11B 20/182 360/51 |

(Continued)

*Primary Examiner* — Nabil Z Hindi
(74) *Attorney, Agent, or Firm* — White & Case LLP (57) ABSTRACT

According to an embodiment, the magnetic disk device includes a disk medium and a control circuit. The disk medium includes a first region including a first track. The control circuit controls a write operation of first data to the first track, executes error correction coding of the first data during the write operation. The control circuit makes first determination on whether the written first data is protected by an error correction code. The control circuit sets a second track in a location adjacent to the first track in accordance with a result of the first determination.

16 Claims, 7 Drawing Sheets

(56) References Cited

U.S. PATENT DOCUMENTS

2015/0113311 A1* 4/2015 Nakanishi ........... G06F 11/2028
714/3

* cited by examiner

MAGNETIC DISK DEVICE AND CONTROL METHOD

CROSS-REFERENCE TO RELATED APPLICATIONS

This application is based upon and claims the benefit of priority from Japanese Patent Application No. 2018-171675, filed on Sep. 13, 2018; the entire contents of which are incorporated herein by reference.

FIELD

Embodiments described herein relate generally to a magnetic disk device and a control method.

BACKGROUND

Magnetic disk devices include a magnetic head and one or more disk media. The disk medium includes a plurality of concentric tracks. The magnetic head relatively moves on the tracks along with the rotation of the disk medium, and writes data to a track of interest.

DETAILED DESCRIPTION

In general, according to one embodiment, the magnetic disk device includes a disk medium and a control circuit. The disk medium includes a first region including a first track. The control circuit controls a write operation of first data to the first track, executes error correction coding of the first data during the write operation. The control circuit makes first determination on whether the written first data is protected by an error correction code. The control circuit sets a second track in a location adjacent to the first track in accordance with a result of the first determination.

Hereinafter, exemplary embodiments of the magnetic disk device and a control method will be described in detail with reference to the accompanying drawings. The embodiments are merely exemplary and not intended to limit the scope of the present invention.

First Embodiment

Figure 1:
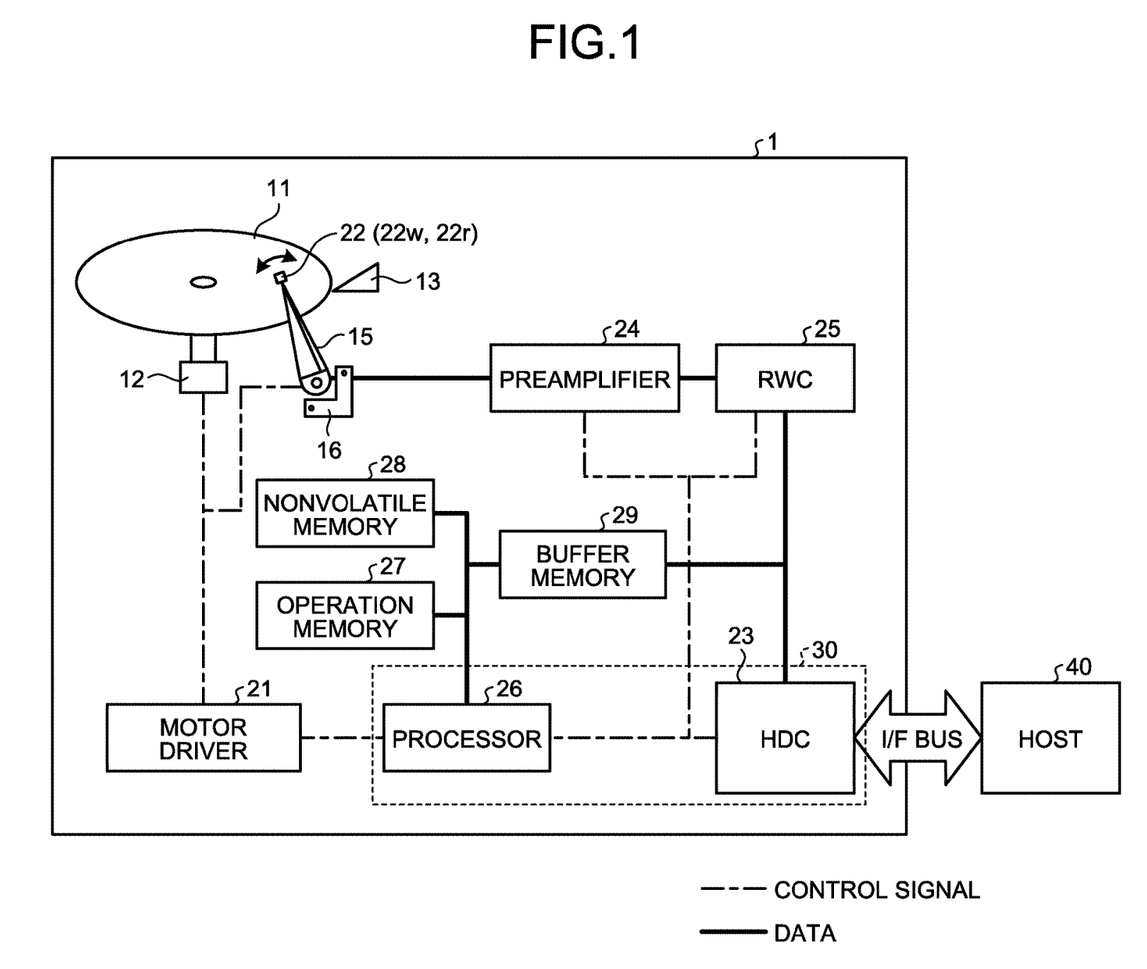
FIG. 1 is a diagram illustrating an exemplary configuration of a magnetic disk device of an embodiment.

FIG. 1 is a diagram illustrating an exemplary configuration of a magnetic disk device 1 of an embodiment.

The magnetic disk device 1 includes a disk medium 11, and records information on the disk medium 11 in response to a request from a host 40.

For example, the magnetic disk device 1 writes information to the disk medium 11 via the magnetic head 22, and reads a signal from the disk medium 11 via the magnetic head 22. Specifically, the magnetic disk device 1 includes the disk medium 11, a spindle motor 12, a motor driver 21, the magnetic head 22, an actuator arm 15, a voice coil motor (VCM) 16, a lamp 13, a preamplifier 24, a read/write channel (RWC) 25, a hard disk controller (HDC) 23, a buffer memory 29, and a processor 26.

The disk medium 11 is rotated about a rotation axis by the spindle motor 12 at a certain rotational speed. The rotation of the spindle motor 12 is driven by the motor driver 21. The disk medium 11 represents a magnetic disk.

The magnetic head 22 is equipped with a write element $22w$ and a read element $22r$ to write and read data to and from the disk medium 11. The magnetic head 22 is located at a distal end of the actuator arm 15, and is moved by the VCM 16 driven by the motor driver 21 in a radial direction (track width direction) of the disk medium 11. While the disk medium 11 stops rotating, for example, the magnetic head 22 is retracted onto the lamp 13.

The preamplifier 24 amplifies the signal read by the magnetic head 22 from the disk medium 11 and outputs the amplified signal to the RWC 25 in a read operation. The preamplifier 24 receives and amplifies a signal for writing data to the disk medium 11 from the RWC 25, and supplies the amplified signal to the magnetic head 22.

The HDC 23 controls data transmission and reception with the host 40 via an I/F bus, controls the buffer memory 29, performs error correction to recorded data. The buffer memory 29 is used as a buffer of data to be transmitted to and received from the host 40. The buffer memory 29 temporarily stores data read from the disk medium 11, data to be written onto the disk medium 11, or control firmware read from the disk medium 11.

The RWC 25 receives data to write to the disk medium 11 from the HDC 23 and performs code modulation to the data to supply the modulated data to the preamplifier 24. The RWC 25 performs code demodulation of a signal, read from the disk medium 11 and supplied from the preamplifier 24, into digital data and outputs the digital data to the HDC 23.

The processor 26 represents, for example, a central processing unit (CPU). The processor 26 is connected to an operation memory 27 such as a static random access memory (SRAM), a nonvolatile memory 28 such as a flash read only memory (flash ROM), and a buffer memory 29 for temporary storage such as a synchronous dynamic random access memory (SDRAM).

The processor 26 controls the entire magnetic disk device 1 according to firmware (program data) pre-stored in the nonvolatile memory 28 and the disk medium 11. For example, the processor 26 controls the motor driver 21, the preamplifier 24, the RWC 25, and the HDC 23.

The processor 26 and the HDC 23 can be regarded as the control circuit 30. The control circuit 30 can set tracks. The control circuit 30 can control a write operation of data to the disk medium 11 and a read operation of data from the disk medium 11 by controlling the preamplifier 24, the RWC 25, and the motor driver 21.

In the following, controlling the data write operation will referred to as to writing data and controlling the data read operation will be referred to as to reading data for the sake of simple explanation.

The control circuit 30 may include other elements such as the operation memory 27, the nonvolatile memory 28, the buffer memory 29, the preamplifier 24, and the RWC 25.

Figure 2:
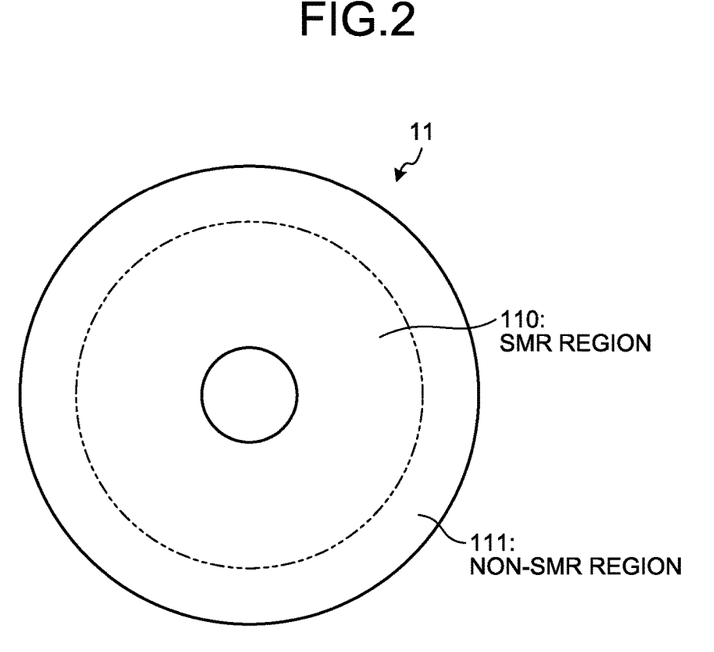
FIG. 2 is a view illustrating a recording region of a disk medium of the embodiment.

FIG. 2 is a view illustrating recording regions of the disk medium 11 of the embodiment. The disk medium 11 includes a shingled magnetic recording (SMR) region 110 to which data is written by SMR, and a non-SMR region 111 to which data is written by another method different from the SMR.

The SMR region 110 has a capacity equivalent to a user capacity. The non-SMR region 111 is a redundant region of the disk medium 11, in addition to the user capacity.

According to the example of FIG. 2, the SMR region 110 is allocated to the inner side of the disk medium 11, and the non-SMR region 111 is allocated to the outer side of the disk medium 11. The SMR region 110 may be allocated to the outer side of the disk medium 11, and the non-SMR region 111 may be allocated to the inner side of the disk medium 11.

Figure 3:
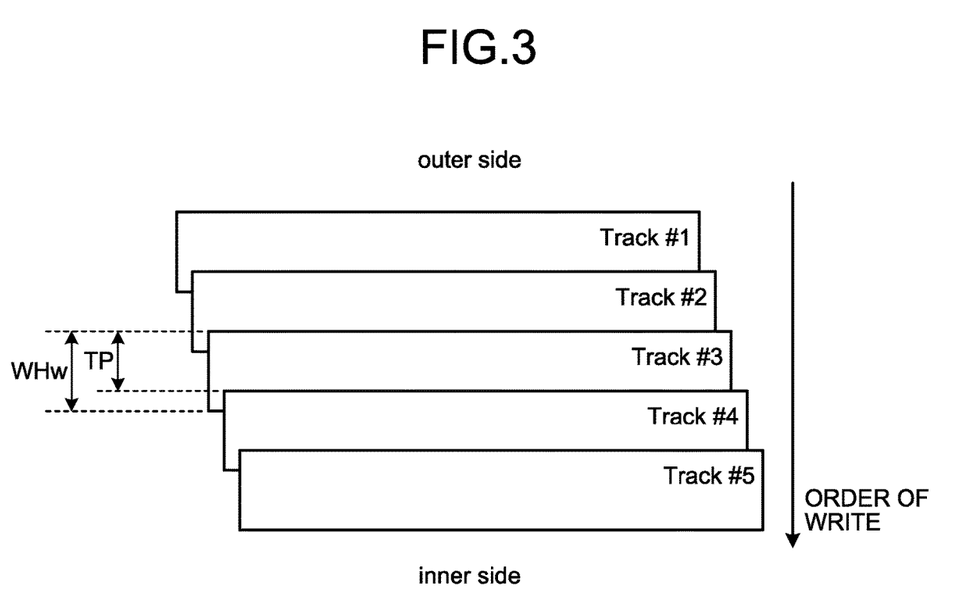
FIG. 3 is an exemplary and schematic view illustrating shingled magnetic recording (SMR) of the embodiment.

FIG. 3 is an exemplary and schematic view illustrating shingled magnetic recording of the embodiment. The SMR is a recording method by which data is written to adjacent tracks in partially overlapping manner. It can be seen from FIG. 3 that by SMR, a track pitch (TP) becomes narrower than a core width (WHw) of the write element 22w of the magnetic head 22.

The track pitch refers to a width of the track in the radial direction of the disk medium 11. The SMR makes it possible to narrow the track pitch, improving the recording density.

FIG. 3 illustrates each track when data is written to the disk medium 101 from the outer side to the inner side. The write direction is not limited thereto. The data may be written to the disk medium 101 from the inner side to the outer side.

Figure 4:
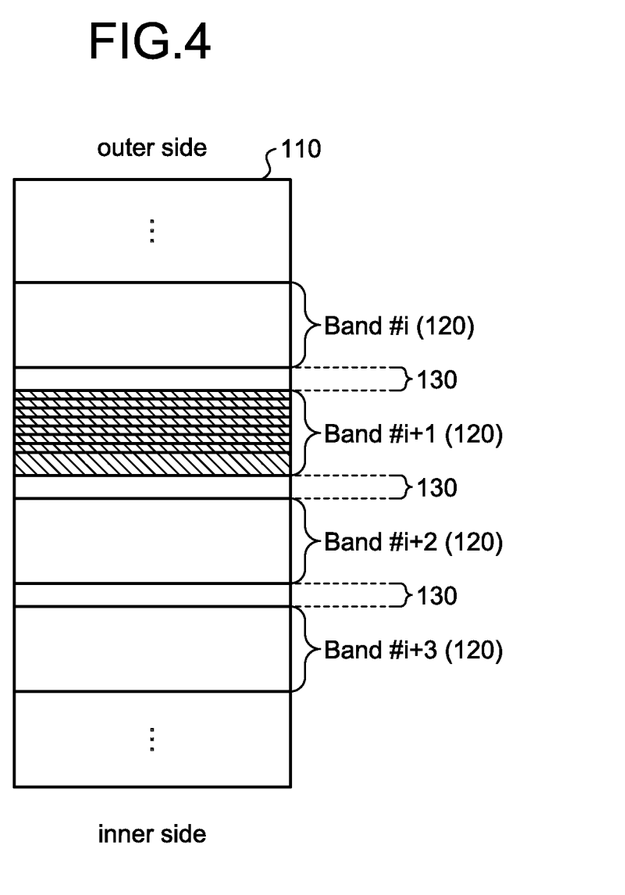
FIG. 4 is a view illustrating an exemplary configuration of an SMR region of the embodiment.

FIG. 4 is a view illustrating an exemplary configuration of the SMR region 110 of the embodiment. The SMR region 110 includes a plurality of bands 120 aligned in the radial direction. The bands 120 have an annular shape. A guard region 130 is allocated between every two bands 120. The guard region 130 is a region where data is not written.

In the specification, the bands 120 may be distinguished from each other by band numbers. That is, the band 120 with band number x will be denoted by a band # x (Band # x).

Data of two or more tracks is written to each of the bands 120 by SMR. The maximum writeable amount of data to each of the bands 120 is set in advance. The bands 120 have a width, i.e. radial length of the disk medium 11 sufficient to allow the setting of the number of tracks equivalent to the set amount. Hereinafter, the set writeable data amount is referred to as a set amount.

In the example of FIG. 4, a band # i+1 is in a state that the set amount of data has been written, and a band # i, a band # i+2, a band # i+3 are in a free state.

The band 120 may be defined as a minimum unit of continuous data write to tracks. In such a case, data rewrite is implemented as follows, for example.

To rewrite part of the data written to the band # i+1 with new data, for example, data is read from all the tracks of the band # i+1. The new data is merged with the data read from the band # i+1, and the merged data is written to another band 120, for example, the band # i. The content of the band # i+1 becomes invalid and ready for another data write. Thereby, data write in unit of a band is implemented.

The definition of the band 120 is not limited thereto. Thus, for example, data write to the band 120 may be suspended and data write to another band 120 may be executed.

The track pitch is narrowed by SMR, which is likely to cause error in read operation. As a measure for correction of the error in read operation, the written data on the track is protected by an error correction code. For example, the error correction code is written to a certain sector of the track.

Figure 5:
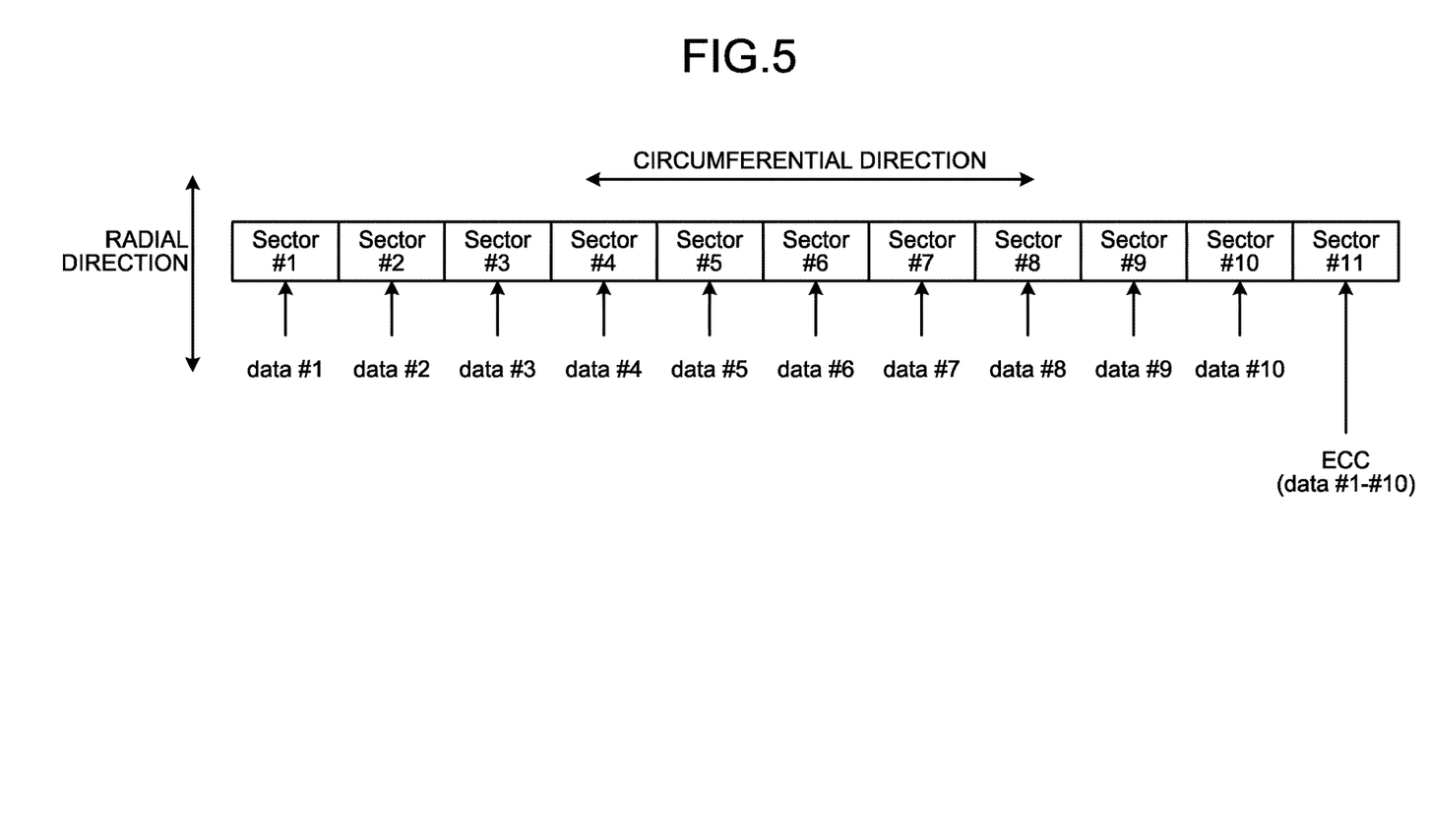
FIG. 5 is a schematic view illustrating an exemplary configuration of one track of a band of the embodiment.

FIG. 5 is a schematic view illustrating an exemplary configuration of one track of the band 120 of the embodiment;

A track is divided into a plurality of sectors. In the example of FIG. 5, the track is divided into eleven sectors.

In the specification, the sectors are distinguished from each other by sector numbers. That is, a sector with sector number x will be denoted as a sector # x (Sector # x). In the example illustrated in the FIG. 5, the track includes eleven sectors from a sector #1 to a sector #11.

Data write is executed as follows, for example. First, data is written to the sectors in the order of sector numbers from the sector #1 to the sector #10. The error correction code (ECC) is written to the last sector #11 of the track.

The ECC written to the sector #11 works to protect written data (data #1 to #10) in the sectors #1 to #10 from error. That is, the ECC written to the sector #11 protects the data in unit of a track.

Error correction coding for generation of the ECC is not limited to a specific method. As an example, the ECC is generated by XOR bitwise operation to the data #1 to the data #10. With occurrence of an error in data read from any of the sectors #1 to #10, the error can be corrected by executing the XOR bitwise operation to the data written to all the sectors except for the sector from which the data has been read, and to the ECC written to the sector #11.

The data #1 to the data #10 and the ECC are written to tracks and protected in unit of a track. In the specification, protecting data by the error correction code in unit of a track as above refers to a track ECC. The written data on the track protected by the track ECC refers to valid track ECC or effective track ECC. The written data on the track unprotected by the track ECC refers to invalid track ECC or ineffective track ECC.

The track ECC can compensate for deterioration in data quality caused by the reduction of the track pitch. However, the track ECC may be ineffective depending on a writing condition.

For example, when write of data to a track is interrupted for some reason before the ECC is written, the ECC is not written, therefore, the track is not protected by the track ECC.

When power is turned off in the middle of writing the ECC to a track, writing the ECC is not completed so that the track is not protected by the track ECC.

If error occurs in a sector of the track in which the track ECC is invalid, the error cannot be corrected. Thus, the quality of written data on the track in which the track ECC is invalid is inferior to the quality of data on a track in which the track ECC is valid.

In view of this, in the embodiment, when writing data to a new track, a determination is made on whether the track ECC is effective in a previous track adjacent to the new track, that is, a track to which data has already been written, the track to be partially overwritten by the new track. The location of a new track is determined depending on a result of the determination.

Figure 6:
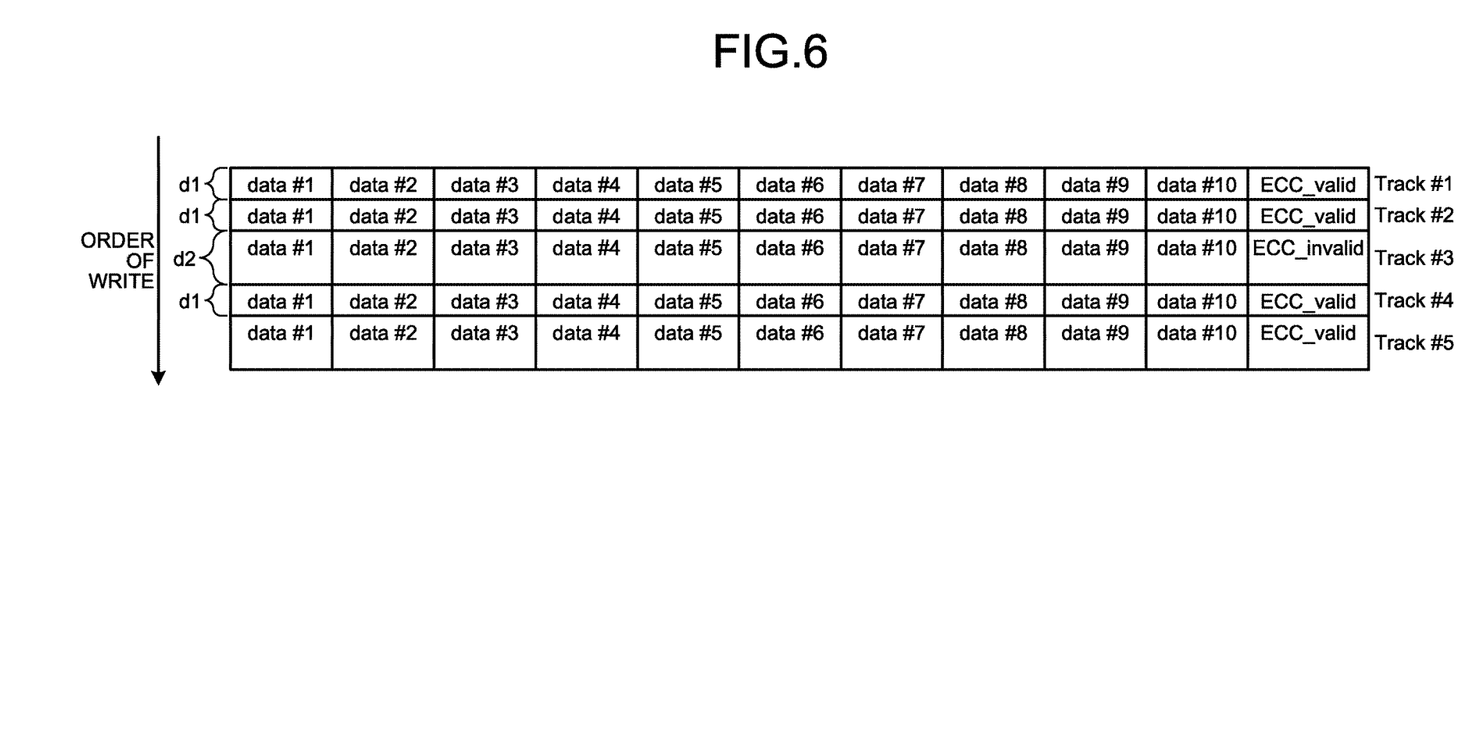
FIG. 6 is an exemplary and schematic view illustrating the main features of the embodiment.

FIG. 6 is an exemplary and schematic view illustrating the main features of the embodiment. For example, a determination is made on whether the track ECC is valid in the track #1 after writing data to the track #1. In the example of FIG. 6, the track ECC of the track #1 is determined to be valid (ECC valid), and data is written by SMR to the track #2 apart from the track #1 by d1 in the radial direction. Thus, a track pitch of the track #1 is d1.

After writing the data to the track #2, a determination is made on whether the track ECC of the track #2 is valid. In the example of FIG. 6, the track ECC of the track #2 is determined as valid (ECC valid), and data is written by SMR to the track #3 apart from the track #2 by d1 in the radial direction. Thus, a track pitch of the track #2 is d1.

After writing the data to the track #3, a determination is made on whether the track ECC of the track #3 is valid. In the example of FIG. 6, the track ECC of the track #3 is determined as invalid (ECC invalid), and data is written by SMR to the track #4 apart from the track #3 by d2, larger than d1, in the radial direction. Thus, a track pitch of the track #3 is d2.

After writing the data to the track #4, a determination is made on whether the track ECC of the track #4 is valid. In the example of FIG. 6, the track ECC of the track #4 is determined as valid (ECC valid), and data is written by SMR to the track #5 apart from the track #4 by d1 in the radial direction. Thus, a track pitch of the track #4 is d1.

That is, when the track ECC of the previous track is determined to be ineffective or invalid, the new track is set in the location so as to widen the track pitch of the previous track from that of when the track ECC of the previous track is determined to be effective or valid.

This results in reducing the occurrence of error at the time of reading data from the previous track. Thereby, the previous track in which the track ECC is ineffective can compensate for the deterioration in quality due to the ineffective track ECC. That is, the quality deterioration can be prevented.

Returning to FIG. 2, data is written to the non-SMR region 111, for example, by conventional magnetic recording (CMR). The CMR is a recording method in which data is written to the tracks so as not to overlap.

Figure 7:
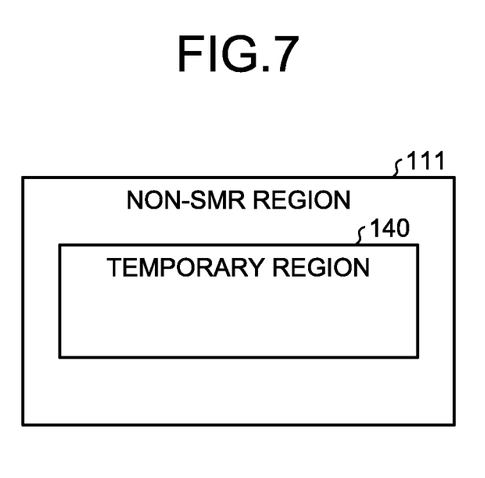
FIG. 7 is a view illustrating an exemplary configuration of a non-SMR region of the embodiment.

FIG. 7 is a view illustrating an exemplary configuration of the non-SMR region 111 of the embodiment. As illustrated in FIG. 7, the non-SMR region 111 includes a temporary region 140 being a redundant region.

Data of a plurality of tracks corresponding to the set amount is written to each of the bands 120. To prepare for part of the tracks having the set track pitch of d2, a radial width of each of the bands 120 may be slightly larger than the sum of track pitches d1 of all the tracks.

However, if a certain band 120 includes a large number of tracks with the track pitch d2, the set amount of data may not be able to be written to the band 120 concerned. The data to be no longer written to the band 120 is written to the temporary region 140.

In other words, the certain band 120 includes tracks with no free region for a new track. When total amount of data less than the set amount is written to the tracks, the remaining amount of data is written to the temporary region 140.

The data written in the temporary region 140 is written to the band 120 being a transfer destination, together with the data read from the band 120 being a transfer source when the content of the band 120 being an original write destination is transferred to another band 120, for example. How to handle the data written in the temporary region 140 is not limited thereto.

Figure 8:
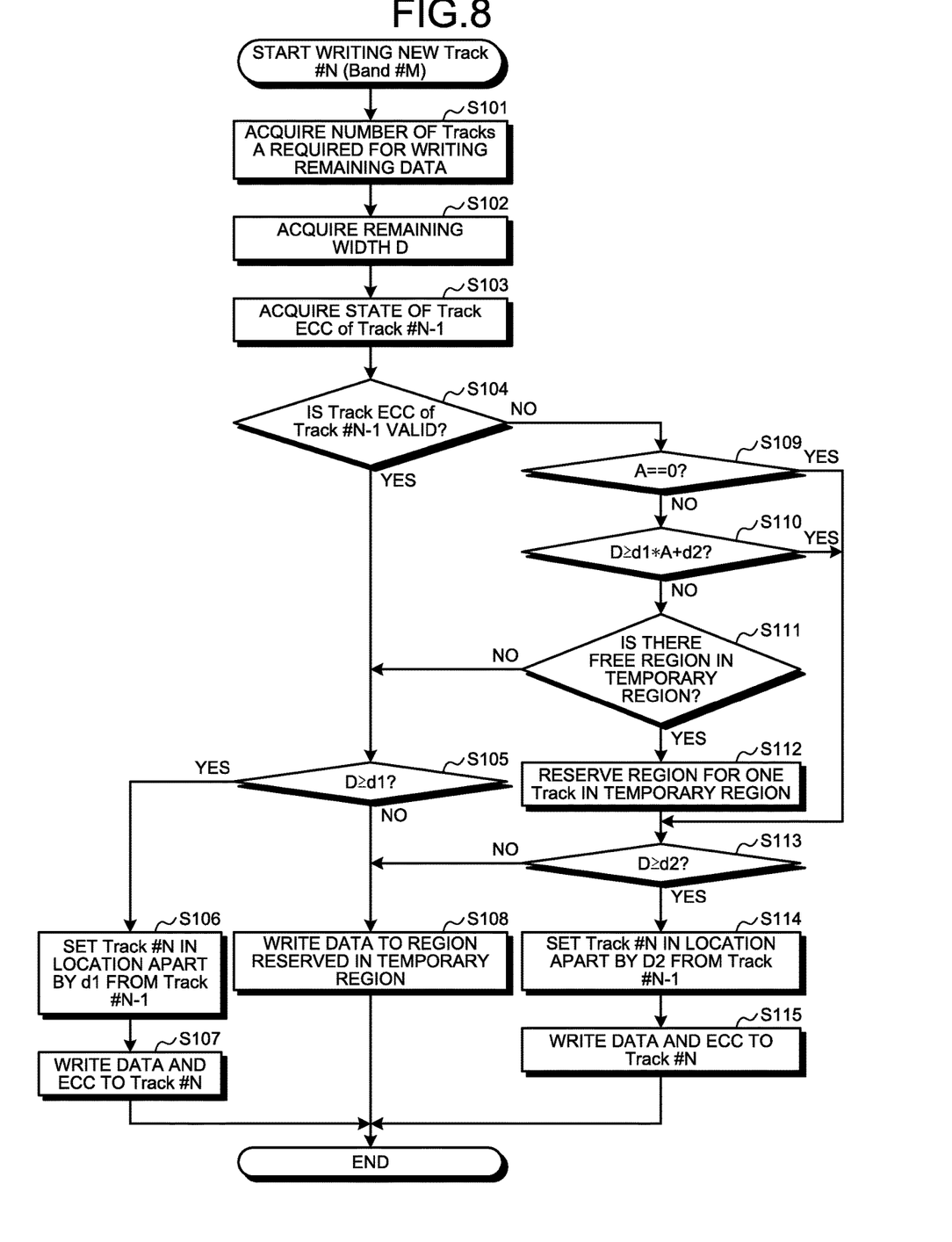
FIG. 8 is a flowchart illustrating an exemplary procedure of data write of the magnetic disk device of the embodiment.

Next, the operation of the magnetic disk device 1 of the embodiment will be described. FIG. 8 is a flowchart illustrating an exemplary procedure relating to data write of the magnetic disk device 1 of the embodiment. Specifically, FIG. 8 illustrates a data write operation to a new track # N of a certain band M. It is assumed that the track #1 to the track # N−1 have already been set and data has been written thereto.

First, the control circuit 30 acquires a number A of tracks required for writing the remaining data (S101).

As described above, the maximum amount (set amount) of data to be written to each band is set in advance. The number of tracks required for writing the remaining data refers to the number of tracks required for writing data of an amount obtained by subtracting the total amount of data written to the band # M from the set amount.

After S101, the control circuit 30 acquires the remaining width (denoted by D) of the band # M (S102). The remaining width of the band # M refers to a width of a region of the band # M where the track has not been set yet.

After S102, the control circuit 30 acquires a state of the track ECC of the track # N−1 (S103). The control circuit 30 determines whether the track ECC of the track # N−1 is valid (S104).

A method of implementing the operations of S103 and S104 is not limited to a specific method.

As one example, the control circuit 30 records, upon every completion of data write, completion of writing the data and the ECC, for example, in a table in association with the track number. The control circuit 30 refers to the table in S103. When finding completion of writing the data and the ECC to the track # N−1, referring to the table, the control circuit 30 determines that the track ECC of the track # N−1 is valid in S104. When finding non-completion of writing the data and the ECC to the track # N−1, the control circuit 30 determines that the track ECC of the track # N−1 is invalid in S104.

For example, suppose that the track # N−1 include ten data sectors and one ECC sector. If data write to the track # N starts after the data is written to part of the ten data sectors, completion of data write to the track # N−1 is not recorded. In such a case, the control circuit 30 finds no recording of completion of data write to the track # N−1, and determines that the track ECC of the track # N−1 is invalid.

If the data write to the track # N starts after data is written to all the ten data sectors of the track # N−1 and the ECC is written to the ECC sector, completion of writing data to the track # N−1 is recorded. In such a case, the control circuit 30 determines that the track ECC of the track # N−1 is valid, from the recorded information.

When determining that the track ECC of the track # N−1 is valid (YES in S104), the control circuit 30 determines whether the remaining width D of the band # M is equal to or larger than d1 (S105).

When the remaining width D of the band # M is equal to or larger than d1, the control circuit 30 can set the track # N in a location apart by d1 from the track # N−1. When, with the remaining width D of the band # M being less than d1, the track # N is set in the location apart by d1 from the track # N−1, the track # N protrudes from the band M. That is, the control circuit 30 determines whether the track # N falls within the band # M when the track # N is set in the location apart by d1 from the track # N−1 in S105.

When determining that the remaining width D of the band # M is equal to or larger than d1 (YES in S105), the control circuit 30 sets the track # N in the location apart by d1 from the track # N−1 (S106).

Then, the control circuit 30 writes the data and the ECC to the track # N (S107). That is, the control circuit 30 generates the ECC from the data to be written to the track # N, and writes the data and the ECC to the track N.

By S107, data write operation to the track # N of the band # M is completed.

When determining that the remaining width D of the band # M is less than d1 (NO in S105), the control circuit 30 writes the data of the track # N to the temporary region 140 (S108). This completes the data write operation to the track # N of the band M.

The temporary region 140 contains a reserved region corresponding to one or more tracks through the operation of S112, as described later. In S108, the control circuit 30 writes the data of the track # N to the reserved region. The control circuit 30 may or may not write the ECC to the temporary region 140 together with the data of the track N. For example, a track width is wider according to the CMR than according to the SMR, thus, in the CMR, error is less likely to occur during read operation. By adopting the CMR for writing data to the non-SMR region 111, writing the ECC is omissible during the data write to the temporary region 140.

In S104, when determining that the track ECC of the track # N−1 is not valid (NO in S104), the control circuit 30 determines whether the number of tracks A is zero (S109).

The number of tracks A being zero means that the track # N is the last track to set in the band M. That is, the control circuit 30 determines whether the track # N is the last track to set in the band # M in Step S109.

When determining that the number A is not zero (NO in S109), the control circuit 30 determines whether the remaining width D is equal to or larger than a value resulting from calculation of d1*A+d2 (S110). That is, when the track pitch of the track # N−1 is d2, the control circuit 30 determines whether to be able to set all the tracks corresponding to the set amount in the band M.

When determining that the remaining width D is less than the value resulting from calculation of d1*A+d2 (NO in S110), the control circuit 30 determines that the band # M cannot contain all the tracks, and reserves a region in the temporary region 140.

That is, the control circuit 30 first determines whether there is a free region for one track in the temporary region 140 (S111). When determining that there is a one-track free region in the temporary region 140 (YES in S111), the control circuit 30 reserves the free region (S112).

Further, the control circuit 30 determines whether the remaining width D of the band # M is equal to or larger than d2 (S113).

When the remaining width D of the band # M is equal to or larger than d2, the control circuit 30 can set the track # N in a location apart by d2 from the track # N−1. When the remaining width D of the band # M is less than d2, the track # N protrudes from the band # M if the track # N is set in the location apart by d2 from the track # N−1. That is, the control circuit 30 determines whether the track # N falls within the band # M when the track # N is set in the location apart by d2 from the track # N−1 in S113.

When determining that the remaining width D of the band # M is equal to or larger than d2 (YES in S113), the control circuit 30 sets the track # N in the location apart by d2 from the track # N−1 (S114), and write data and an ECC to the track # N (S115). This completes the data write operation to the track # N of the band M.

When determining that the remaining width D of the band # M is less than d2 (NO in S113), the control circuit 30 executes the operation of S108.

When determining that the number A is zero (YES in S109), or when determining that the remaining width D is equal to or larger than the value resulting from calculation of d1*A+d2 (YES in S110), the control circuit 30 executes the operation of S113.

The procedure illustrated in FIG. 8 is executed in unit of track. That is, for example, the procedure illustrated in FIG. 8 is executed at the time of writing data to a track # i, and data is then written to a track # i+1 adjacent to the track # i. The procedure illustrated in FIG. 8 is executed at the time of writing the data to the track # i+1. Through repetition of the procedure illustrated in FIG. 8 in unit of track, the characteristic operation illustrated in FIG. 6 can be implemented.

As described above, according to the embodiment the control circuit 30 sets a first track (for example, the track # N−1) in one band 120 and writes data to the first track. The control circuit 30 determines whether the data written to the first track is protected by the error correction code. Further, the control circuit 30 determines a location of a second track to set on the basis of a result of the determination on whether the data written to the first track is protected by the error correction code.

To be specific, when determining that the data written to the first track is protected by the error correction code, for example, the control circuit 30 sets the second track (for example, the track # N) in a location apart from the first track by a first length (for example, d1). When determining that the data written to the first track is not protected by the error correction code, for example, the control circuit 30 sets the second track in a location apart from the first track by a second length (for example, d2) longer than the first length.

With this configuration, when the track ECC of the first track is invalid, the deterioration in data quality in the first track due to the invalid track ECC can be compensated for by increasing the track pitch of the first track. In other words, the deterioration in data quality can be prevented.

The above embodiment has described writing data to the band 120 by SMR. Thus, when the second track is set in the location apart by the first length from the first track, the second track overlaps with a part of the first track. When the second track is set in the location apart by the second length from the first track, the second track may or may not overlap with the first track.

According to the embodiment, the control circuit 30 sets tracks in a band 120 until there remains no space for a new track and writes data to the set tracks. When the total amount of written data is less than the set amount, the control circuit 30 writes the remaining amount of data to the temporary region 140.

With such a configuration, the control circuit 30 can continue writing if the band 120 includes a track with a track pitch being the second length and cannot thus contain the set amount of data.

According to the embodiment, the control circuit 30 determines the location of the second track to set, on the basis of the result of the determination on whether the data written to the first track is protected by the error correction code and the capacity of the free region of the temporary region 140.

In the example of FIG. 8, specifically, the control circuit 30 determines whether to be able to set all the tracks, corresponding to the set amount and including the track # N−1 and the track # N, in the band # M, upon assuming that the track # N (first track) be set in the location apart by d2 (second length) from the track # N−1 (second track). Upon determining that all the tracks corresponding to the set amount cannot be set in the band # M, the control circuit 30 determines whether there is a free region for one track in the temporary region 140. When determining that there is a free region for one track in the temporary region 140, the control circuit 30 sets the track # N in the location apart by d2 from the track # N-1.

With such a configuration, the control circuit 30 can continue writing if the track pitch of one track is set to the second length and the band 120 cannot thus contain the set amount of data.

The control circuit 30 reserves a one-track region in the free region of the temporary region 140 when determining that the tracks corresponding to the set amount are not settable in the band and then setting the second track in the location apart by the second length from the first track.

With such a configuration, if the band 120 cannot contain the set amount of data due to a track with the track pitch being the second length, the control circuit 30 can write the remaining amount of data to the temporary region 140.

The above embodiment has described the method for the control circuit 30 to determine whether the data written to the first track is protected by the error correction code, in accordance with completion or non-completion of writing data and the ECC, by way of example.

Specifically, the control circuit 30 is configured to generate the ECC on the basis of data to be written to the track # N-1 (first track) and write the data and the generated ECC to the track # N-1. The control circuit 30 determines whether the writing of the data and the ECC to the track # N-1 is completed. Upon determining completion of writing the data and the ECC to the track # N-1, the control circuit 30 determines that the written data in the track # N-1 is protected by the error correction code. Upon determining non-completion of writing the data and the ECC to the track # N-1, the control circuit 30 determines that the written data in the track # N-1 is not protected by the error correction code.

By such a method, whether the written data in the first track is protected by the error correction code can be easily determined. However, the manner of determining whether the written data in the first track is protected by the error correction code is not limited thereto.

There are two known control methods of the magnetic disk device 1, i.e., drive-managed and host-managed.

According to the drive-managed method, when receiving data from the host 40, the control circuit 30 buffers the data in the buffer memory 29 or the temporary region 140, and can write the buffered data to the band 120 of interest at desirable timing. In other words, data write in unit of the band 120 is easily feasible by the drive-managed method.

Meanwhile, according to the host-managed method the host 40 designates a write destination (band 120). When completing data write to the designated write destination, the control circuit 30 can notify the host 40 of the completion of data write. The write timing to the disk medium 11 depends on a command from the host 40, therefore, the control circuit 30 cannot directly control the data write in unit of the band 120. Thus, the host-managed method may be more likely to cause interruption of data write in the middle of a track than the drive-managed method. In other words, a host-managed magnetic disk device may include a larger number of tracks with ineffective track ECC than a drive-managed disk device.

The track setting method of the embodiment is applicable to both the drive-managed magnetic disk device and the host-managed magnetic disk device. When a large number of tracks, for which the track ECC is not effective, occurs, the host-managed magnetic disk device can compensate for the deterioration in data quality caused by the ineffective track ECC.

The above embodiment has described the example of writing the data by SMR, receiving data from the host 40. The above track setting method is applicable to a magnetic disk device which writes the data by CMR, receiving data from the host 40.

The above embodiment has described that the control circuit 30 selects one of the first length (for example, d1) and the second length (for example, d2) as the track pitch of the first track (for example, the track # N-1). The control circuit 30 may select the track pitch of the first track from three or more lengths.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk medium comprising a first region including a first track; and
   a control circuit that
   controls a write operation of first data to the first track,
      executes error correction coding of the first data during the write operation,
   makes first determination on whether the written first data is protected by an error correction code, and
   sets a second track in a location adjacent to the first track in accordance with a result of the first determination, wherein the control circuit
      when determining that the first data is protected by the error correction code, sets the second track in a location apart from the first track by a first length in a radial direction of the disk medium, and
      when determining that the first data is not protected by the error correction code, sets the second track in a location apart from the first track by a second length in the radial direction of the disk medium, the second length being longer than the first length.

2. The magnetic disk device according to claim 1, wherein the second track, while set in the location apart from the first track by the first length, overlaps with a part of the first track.

3. The magnetic disk device according to claim 1, wherein the disk medium further includes a second region being a redundant region and different from the first region, and the control circuit
   sets a plurality of third tracks including the first track and the second track until the first region includes no space for setting a new track,
   controls a write operation of data to the plurality of third tracks, and
   controls, when a total amount of the written data is less than a set amount, a write operation of a remaining amount of data to the second region.

4. The magnetic disk device according to claim 3, wherein the control circuit determines the location of the second track to set, on the basis of a result of the first determination and capacity of a free region of the second region.

5. The magnetic disk device according to claim 4, wherein the control circuit
determines whether to be able to set a plurality of fourth tracks in the first region, assuming that the second track be set in the location apart from the first track by the second length in the radial direction of the disk medium, the fourth tracks corresponding to the set amount and including the first track and the second track,
when determining to be unable to set the fourth tracks in the first region, determines whether the second region includes a free region for one track, and
when determining that the second region includes a free region for one track, sets the second track in the location apart from the first track by the second length.

6. The magnetic disk device according to claim 5, wherein
when determining that the second region includes the free region for one track and setting the second track in the location apart from the first track by the second length, the control circuit reserves the free region for one track.

7. The magnetic disk device according to claim 6, wherein
the control circuit controls a writing operation of the remaining amount of data to the reserved free region in the second region.

8. A magnetic disk device comprising:
a disk medium comprising a first region including a first track; and
a control circuit that
controls a write operation of first data to the first track, executes error correction coding of the first data during the write operation,
makes first determination on whether the written first data is protected by an error correction code, and
sets a second track in a location adjacent to the first track in accordance with a result of the first determination, wherein
the control circuit
controls generation of the error correction code from the first data and a write operation of the first data and the generated error correction code to the first track,
determines whether the write operation of the first data and the error correction code is completed,
when determining that the write operation of the first data and the error correction code is completed, determines that the first data is protected by the error correction code, and
when determining that the write operation of the first data and the error correction code is not completed, determines that the first data is not protected by the error correction code.

9. A control method for a magnetic disk device comprising a disk medium having an error correction coding function, the control method comprising:
controlling a write operation of data to a first track in a first region of the magnetic disk;
determining whether the written data is protected by an error correction code; and
setting a second track in a location adjacent to the first track on the basis of a result of the determination, wherein
the setting includes
when determining that the data is protected by the error correction code, setting the second track in a location apart from the first track by a first length in a radial direction of the disk medium, and
when determining that the data is not protected by the error correction code, setting the second track in a location apart from the first track by a second length in the radial direction of the disk medium, the second length being longer than the first length.

10. The control method according to claim 9, wherein
the second track, while set in the location apart from the first track by the first length, overlaps with a part of the first track.

11. The control method according to claim 9, further comprising:
setting a plurality of third tracks including the first track and the second track until the first region includes no space for setting a new track,
controlling a write operation of data to the plurality of third tracks, and
controlling, when a total amount of the written data is less than a set amount, a write operation of a remaining amount of data to a second region being a redundant region and different from the first region.

12. The control method according to claim 11, wherein
the second track setting includes determining the location of the second track to set on the basis of a result of the determination and capacity of a free region of the second region.

13. The control method according to claim 12, wherein
the second track setting includes
determining whether to be able to set a plurality of fourth tracks in the first region, assuming that the second track be set in the location apart from the first track by the second length in the radial direction of the disk medium, the fourth tracks corresponding to the set amount and including the first track and the second track,
when determining to be unable to set the fourth tracks in the first region, determining whether the second region includes a free region for one track, and
when determining that the second region includes a free region for one track, setting the second track in the location apart from the first track by the second length.

14. The control method according to claim 12, further comprising
reserving the free region for one track when determining that the second region includes the free region for one track and setting the second track in the location apart from the first track by the second length.

15. The control method according to claim 14, further comprising
controlling a write operation of a remaining amount of data to the free region reserved in the second region.

16. A control method for a magnetic disk device comprising a disk medium having an error correction coding function, the control method comprising:
controlling a write operation of data to a first track in a first region of the magnetic disk;
determining whether the written data is protected by an error correction code;
setting a second track in a location adjacent to the first track on the basis of a result of the determination; and
controlling generation of the error correction code from the data and a write operation of the data and the generated error correction code to the first track, wherein the determining includes
determining whether the write operation of the data and the error correction code is completed, when determining that the write operation of the data and the error correction code is completed, determining that the data is protected by the error correction code, and when determining that the write operation of the data and the error correction code is not completed, determining that the data is not protected by the error correction code.

\* \* \* \* \*